(12) United States Patent
Ogura et al.

(10) Patent No.: US 10,846,394 B2
(45) Date of Patent: Nov. 24, 2020

(54) INFORMATION PROCESSING APPARATUS, INFORMATION PROCESSING METHOD, AND COMPUTER PROGRAM PRODUCT

(71) Applicant: Kabushiki Kaisha Toshiba, Minato-ku (JP)

(72) Inventors: Naoki Ogura, Yokohama (JP); Yoshikazu Hanatani, Komae (JP); Shinya Takumi, Kawasaki (JP); Masanobu Koike, Tama (JP); Hiroyoshi Haruki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 331 days.

(21) Appl. No.: 15/900,109

(22) Filed: Feb. 20, 2018

(65) Prior Publication Data
US 2019/0080080 A1  Mar. 14, 2019

(30) Foreign Application Priority Data

Sep. 11, 2017  (JP) .................................. 2017-173977

(51) Int. Cl.
*G06F 21/51* (2013.01)
*G06F 21/57* (2013.01)
*G06F 9/445* (2018.01)

(52) U.S. Cl.
CPC .......... *G06F 21/51* (2013.01); *G06F 9/44536* (2013.01); *G06F 21/57* (2013.01); *G06F 2221/033* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 5,758,068 A * | 5/1998 | Brandt | .................... | G06F 21/10 705/59 |
| 7,124,408 B1 * | 10/2006 | Parthasarathy | ......... | G06F 21/51 717/170 |
| 8,589,691 B1 * | 11/2013 | Hackborn | ............... | G06F 21/51 713/176 |
| 8,683,597 B1 * | 3/2014 | Johansson | ............. | H04L 63/083 726/25 |

(Continued)

FOREIGN PATENT DOCUMENTS

JP  2011-123675 A  6/2011
JP  2012-14320 A  1/2012

(Continued)

*Primary Examiner* — Saleh Najjar
*Assistant Examiner* — Michael W Chao
(74) *Attorney, Agent, or Firm* — Oblon, McClelland, Maier & Neustadt, L.L.P.

(57) ABSTRACT

According to an embodiment, an information processing apparatus includes one or more processors. One or more processors acquire first distinctive information of a first piece of software to be executed. When a whitelist that specifies distinctive information of pieces of software that are permitted to be executed records the distinctive information indicating the first distinctive information, one or more processors distinctively identify, as second distinctive information, the distinctive information of a second piece of software that represents another piece of software relating to the first piece of software in the whitelist.

13 Claims, 11 Drawing Sheets

(56) References Cited

U.S. PATENT DOCUMENTS

| | | | | |
|---|---|---|---|---|
| 8,819,655 B1* | 8/2014 | Hopwood | G06F 8/658 | 717/168 |
| 8,950,007 B1* | 2/2015 | Teal | G06F 21/57 | 726/30 |
| 8,959,362 B2* | 2/2015 | Pettigrew | G05B 19/048 | 713/187 |
| 10,528,741 B1* | 1/2020 | Collins | G06F 8/70 | |
| 10,579,830 B1* | 3/2020 | Bendersky | G06F 21/121 | |
| 10,628,577 B2* | 4/2020 | Koohgoli | G06F 8/751 | |
| 10,678,527 B2* | 6/2020 | Oh | G06F 21/51 | |
| 2001/0011253 A1* | 8/2001 | Coley | G06F 21/10 | 705/59 |
| 2002/0091644 A1* | 7/2002 | Wong | G06F 21/10 | 705/59 |
| 2003/0187801 A1* | 10/2003 | Chase, Jr. | G06F 21/10 | 705/59 |
| 2004/0117784 A1* | 6/2004 | Endoh | G06F 21/10 | 717/169 |
| 2005/0049973 A1* | 3/2005 | Read | G06F 21/10 | 705/59 |
| 2005/0114266 A1* | 5/2005 | Satkunanathan | G06Q 30/06 | 705/59 |
| 2005/0235010 A1* | 10/2005 | Bates | G06F 9/4494 | |
| 2006/0150256 A1* | 7/2006 | Fanton | G06F 21/10 | 726/27 |
| 2006/0265337 A1* | 11/2006 | Wesinger, Jr. | G06Q 20/367 | 705/65 |
| 2009/0083852 A1* | 3/2009 | Kuo | G06F 21/564 | 726/22 |
| 2010/0122088 A1* | 5/2010 | Oxford | G06F 21/10 | 713/168 |
| 2012/0311710 A1* | 12/2012 | Butler | G06F 21/51 | 726/24 |
| 2013/0333039 A1* | 12/2013 | Kelly | G06F 21/51 | 726/24 |
| 2014/0090063 A1* | 3/2014 | Calnan | G06F 21/51 | 726/25 |
| 2014/0090077 A1* | 3/2014 | Jeong | G06F 21/60 | 726/26 |
| 2014/0359283 A1* | 12/2014 | Lee | H04L 67/2852 | 713/165 |
| 2015/0379262 A1* | 12/2015 | Islam | G06F 21/51 | 726/22 |
| 2016/0182550 A1* | 6/2016 | Spurlock | G06F 21/566 | 726/23 |
| 2016/0203313 A1* | 7/2016 | El-Moussa | G06F 8/65 | 726/23 |
| 2016/0323106 A1* | 11/2016 | Roper | G06F 21/51 | |
| 2017/0061105 A1* | 3/2017 | Minagawa | G06F 21/10 | |
| 2017/0124327 A1* | 5/2017 | Kumbhar | G06F 21/566 | |
| 2017/0329969 A1* | 11/2017 | Murata | G06F 9/445 | |
| 2018/0082047 A1* | 3/2018 | Mayo | G06F 21/121 | |
| 2018/0253809 A1* | 9/2018 | Meyer | G06F 21/105 | |
| 2018/0373523 A1* | 12/2018 | Wei | G06F 8/65 | |
| 2019/0044958 A1* | 2/2019 | Woodworth, Jr. | H04L 63/101 | |
| 2020/0004966 A1* | 1/2020 | Mohinder | G06F 21/57 | |
| 2020/0134196 A1* | 4/2020 | Collins | G06F 21/51 | |

FOREIGN PATENT DOCUMENTS

| | | |
|---|---|---|
| JP | 5682978 B2 | 3/2015 |
| JP | 2016-506671 A1 | 3/2016 |

* cited by examiner

FIG.3A

UPDATE SOFTWARE INFORMATION

| IDENTIFICATION INFORMATION ||  SOFTWARE |
| SOFTWARE NAME | VERSION INFORMATION | |
| --- | --- | --- |
| A | Ver.3 | A_ver3.exe |

OLD SOFTWARE INFORMATION

| IDENTIFICATION INFORMATION ||  SOFTWARE |
| SOFTWARE NAME | VERSION INFORMATION | |
| --- | --- | --- |
| A | Ver.2 | A_ver2.exe |
| A | Ver.1 | A_ver1.exe |
| B | Ver.1 | B_ver1.exe |
| C | Ver.1 | C_ver1.exe |
| D | Ver.2 | D_ver2.exe |
| D | Ver.1 | D_ver1.exe |

| IDENTIFICATION INFORMATION ||
| SOFTWARE NAME | VERSION INFORMATION |
| --- | --- |
| A | Ver.2 |
| A | Ver.1 |
| B | Ver.1 |
| C | Ver.1 |

FIG.5A

WHITELIST

| DISTINCTIVE INFORMATION | path | HASH VALUE |
|---|---|---|
| 01 | C¥pg¥01¥······ | xxxx |
| 02 | C¥pg¥02¥······ | xxxy |
| 03 | C¥pg¥03¥······ | xxxz |
| 04 | C¥pg¥04¥······ | xxpp |
| 05 | C¥pg¥05¥······ | dxlp |
| 06 | C¥pg¥06¥······ | cccx |
| 07 | C¥pg¥07¥······ | mmbm |

CONTROL INFORMATION

| DISTINCTIVE INFORMATION | IDENTIFICATION INFORMATION | | DATA OF INSTALLATION | RELATED DISTINCTIVE INFORMATION |
|---|---|---|---|---|
| | SOFTWARE NAME | VERSION INFORMATION | | |
| 01 | A | Ver.3 | 20xx/yy/zz | 02, 03 |
| 02 | A | Ver.2 | 20xx/yy/zz | 01 |
| 03 | A | Ver.1 | 20xx/yy/zz | - |
| 04 | B | Ver.1 | 20xx/yy/zz | - |
| 05 | C | Ver.1 | 20xx/yy/zz | - |
| 06 | D | Ver.2 | 20xx/yy/zz | 07 |
| 07 | D | Ver.1 | 20xx/yy/zz | - |

← 24B

US 10,846,394 B2

INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-173977, filed on Sep. 11, 2017; the entire contents of which are incorporated herein by reference.

FIELD

Embodiments described herein relate to an information processing apparatus, an information processing method, and a computer program product.

BACKGROUND

Techniques are known to prevent malicious programs from being executed. One known technique, for example, limits software programs that are permitted to be executed only to those programs recorded in a whitelist. A method is also known, in order to securely update the whitelist, to automatically add to the whitelist only those software programs security of which has been guaranteed by a master file list.

Consider a case in which software programs that are not updated become unnecessary as a result of a system update and such software programs may be left recorded in the whitelist. Through the lapse of time, the software programs that are not updated may be compromised and, if such a software program is executed, system security may be impaired. From a security viewpoint, it is preferable that the compromised software and unnecessary software be immediately deleted from the whitelist. Unfortunately, however, system availability may be impaired by the updating of such a whitelist.

BRIEF DESCRIPTION OF THE DRAWINGS

FIG. 3A is a schematic diagrams of data configuration of update software information;

FIG. 33 is a schematic diagrams of old software information;

FIG. 3C is a schematic diagrams of identification information of software to be updated;

FIGS. 5A and 5B are schematic diagrams of configurations of data stored in a storage;

DETAILED DESCRIPTION

According to an embodiment, an information processing apparatus includes one or more processors. One or more processors acquire first distinctive information of a first piece of software to be executed. When a whitelist that specifies distinctive information of pieces of software that are permitted to be executed records the distinctive information indicating the first distinctive information, one or more processors distinctively identify, as second distinctive information, the distinctive information of a second piece of software that represents another piece of software relating to the first piece of software in the whitelist.

Embodiments will be described below in detail with reference to the accompanying drawings.

Figure 1:
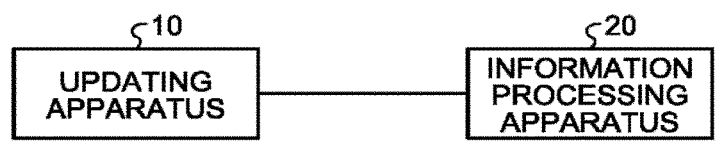
FIG. 1 is a schematic diagram of an exemplary information processing system.

FIG. 1 is a schematic diagram of an exemplary information processing system 1 according to an embodiment.

The information processing system 1 includes an updating apparatus 10 and an information processing apparatus 20. The updating apparatus 10 and the information processing apparatus 20 are connected so as to be capable of transmitting and receiving data and signals via a communication line such as a wired line or a wireless line.

It is noted that the updating apparatus 10 and the information processing apparatus 20 may transmit and receive information via a storage medium. The updating apparatus 10 may, for example, store information in a storage medium. The information processing apparatus 20 may then acquire from the updating apparatus 10 the information by reading the information from the storage medium.

The updating apparatus 10 transmits update software, for example, to the information processing apparatus 20. The update software represents software that has been updated. For example, the update software is software of the latest version at the time of the transmission of the update software.

Figure 2:
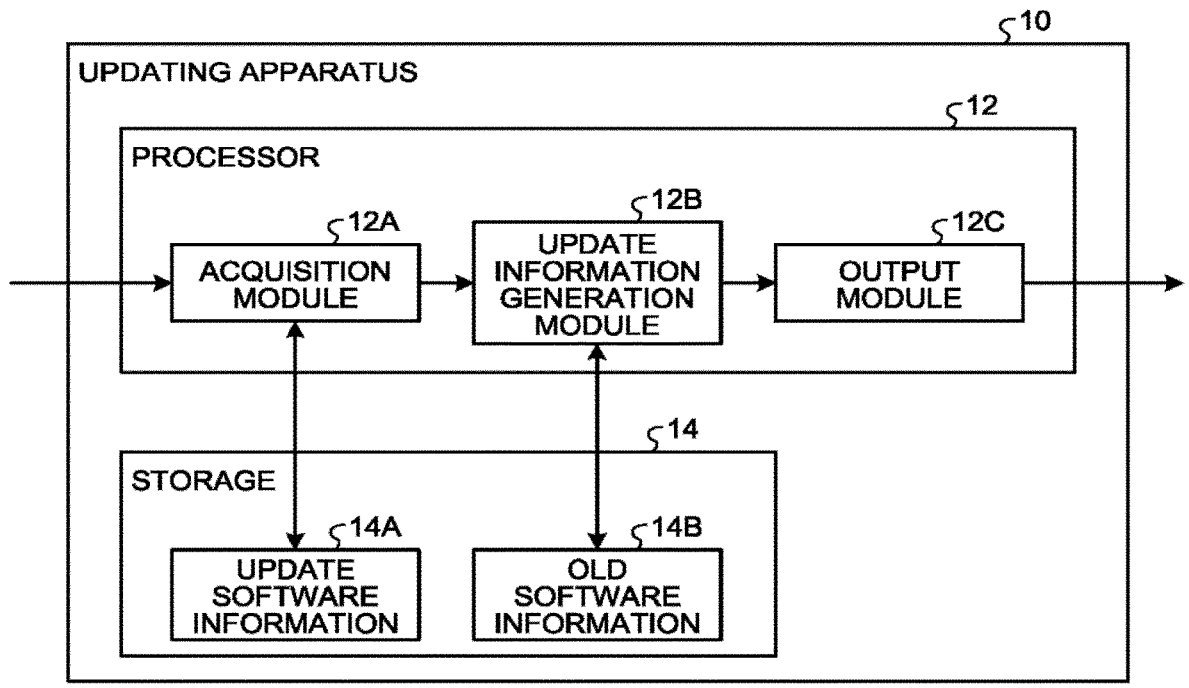
FIG. 2 is a schematic diagram of a functional configuration of an updating apparatus.

FIG. 2 is a schematic diagram of a functional configuration of the updating apparatus 10. The updating apparatus 10 includes a processor 12 and a storage 14. The processor 12 and the storage 14 are connected so as to be capable of transmitting and receiving data and signals.

The storage 14 stores various types of data. In the embodiment, the storage 14 stores update software information 14A and old software information 14B.

FIGS. 3A to 3C are schematic diagrams of exemplary data configurations of the update software information 14A illustrated in FIG. 3A, of the old software information 14B illustrated in FIG. 3B, and of identification information of software to be updated illustrated in FIG. 3C.

FIG. 3A is a schematic diagram of the exemplary data configuration of the update software information 14A. The update software information 14A represents information indicating update software. The update software information 14A includes identification information and software. The term "software", as used herein, refers to computer programs including an executable file, a static link library file, a dynamic link library file, a shared library file, and a script file.

The software included in the update software information 14A is update software.

In the following description of the embodiment, update software, software to be updated, a first piece of software, and a second piece of software will be collectively referred to simply as software. The software to be updated, the first piece of software, and the second piece of software will be detailed later.

The identification information identifies software. In the embodiment, the identification information includes version information and a software name. Specifically, in the embodiment, the identification information identifies the software version and software name uniquely. It is noted that the identification information may include the software name, the version information, and a date on which the software is released. Specifically, the identification information may identify uniquely the software version, are name, and the date of release.

The version information indicates version, or a stage of a revision of software. The version information includes a numeric value that is greater to indicate a later (specifically, newer) revision. The update software information 14A includes the version information of the corresponding update software.

The software name represents a name of the software. In the embodiment, an identical software name is assigned to identical software. To state the foregoing differently, two different pieces of software, each having a unique version, have the same software name assigned thereto.

It is noted at the update software information 14A may include, for example, the date of release of software and dependency information. The date of release of software indicates the date on which the software is released. The dependency information indicates dependency of the software and is provided by a software generator.

The old software information 14B represents information relating to software, output to the information processing apparatus 20 in the past. For example, information relating to all pieces of software, output from the updating apparatus 10 to the information processing apparatus 20, is recorded in the old software information 14B.

FIG. 3B is a schematic diagram of the exemplary data configuration of the old software information 14B. The old software information 14B represents a record of identification information (software name, version information) associated with software.

It is noted that the old software information 14B may further include the date of release of software and dependency information.

Reference is made back to FIG. 2. The following describes the processor 12.

The processor 12 controls the updating apparatus 10. The processor 12 includes an acquisition module 12A, an update information generation module 12B, and an output module 12C. Each of the foregoing elements (the acquisition module 12A, the update information generation module 12B, and the output module 12C) is achieved by, for example, one or a plurality of processors.

The foregoing elements may each be achieved, for example, by causing a central processing unit (CPU) or other type of processor to execute a program, specifically, by software. The foregoing elements may each be achieved, for example, by a dedicated integrated circuit (IC) or other type of processor, specifically, by hardware. Alternatively, the foregoing elements may each be achieved through a combined use of software and hardware. When a plurality of processors are to be incorporated, each of the processors may achieve one, or two or more of the elements.

The acquisition module 12A acquires the update software information 14A. The acquisition module 12A reads the update software information 14A from the storage 14 to thereby acquire the update software information 14A. The storage 14, for example, receives from an external device, for example, the update software information 14A that indicates the latest software and stores the update software information 14A in advance. When a system update request or other request is received from the external device, for example, the acquisition module 12A has only to acquire the update software information 14A from the storage 14.

Alternatively, the acquisition module 12A may acquire the update software information 14A from the external device.

The update information generation module 12B receives the update software information 14A from the acquisition module 12A. The update information generation module 12B records the received update software information 14A in the old software information 14B. The update information generation module 12B uses the update software information 14A and the old software information 14B to generate update information.

The update information includes update software and identification information of other pieces of software relating to the update software.

For example, the update information generation module 12B uses the software included in the update software information 14A as the update software to the update information. The update information generation module 12B searches the old software information 14B for the identification information of the other pieces of software relating to the update software. It should here be noted that, in the following description, the update software refers to the software included in the update software information 14A.

Specifically, the update information generation module 12B searches the old software information 14B for pieces of software having the same software name as the update software. In this case, the update information generation module 12B searches the old software information 14B for other pieces of software having the same software name as the update software, but of different versions. Then, the update information generation module 12B reads from the old software information 14B the identification information (software name, version information) associated with the other pieces of software found in the old software information 14B. The update information generation module 12B thereby obtains the identification information of the other pieces of software relating to the update software.

The update information generation module 12B may further search, as the identification information of the other pieces of software relating to the update software, for identification information of other pieces of software that may be started through operative association with the update software when the update software is started.

FIG. 3C is a diagram of an exemplary list of identification information of the other pieces of software relating to the update software. For example, for the identification information of the other pieces of software relating to the update software having the software name "A" and the version information "Ver. 3", the update information generation module 12B refers to "A, Ver. 2", "A, Ver. 1", "B, Ver. 1", and "C, Ver. 1" as the identification information specified by the software name and the version information.

Reference is made back to FIG. 2. The update information generation module 12B generates the update information that includes the update software and the identification information of the other pieces of software relating to the update software. It is noted that the update information generation module 12B may generate update information that further includes a hash value of the update software.

The output module 12C outputs the update information generated by the update information generation module 12B to the information processing apparatus 20.

Figure 4:
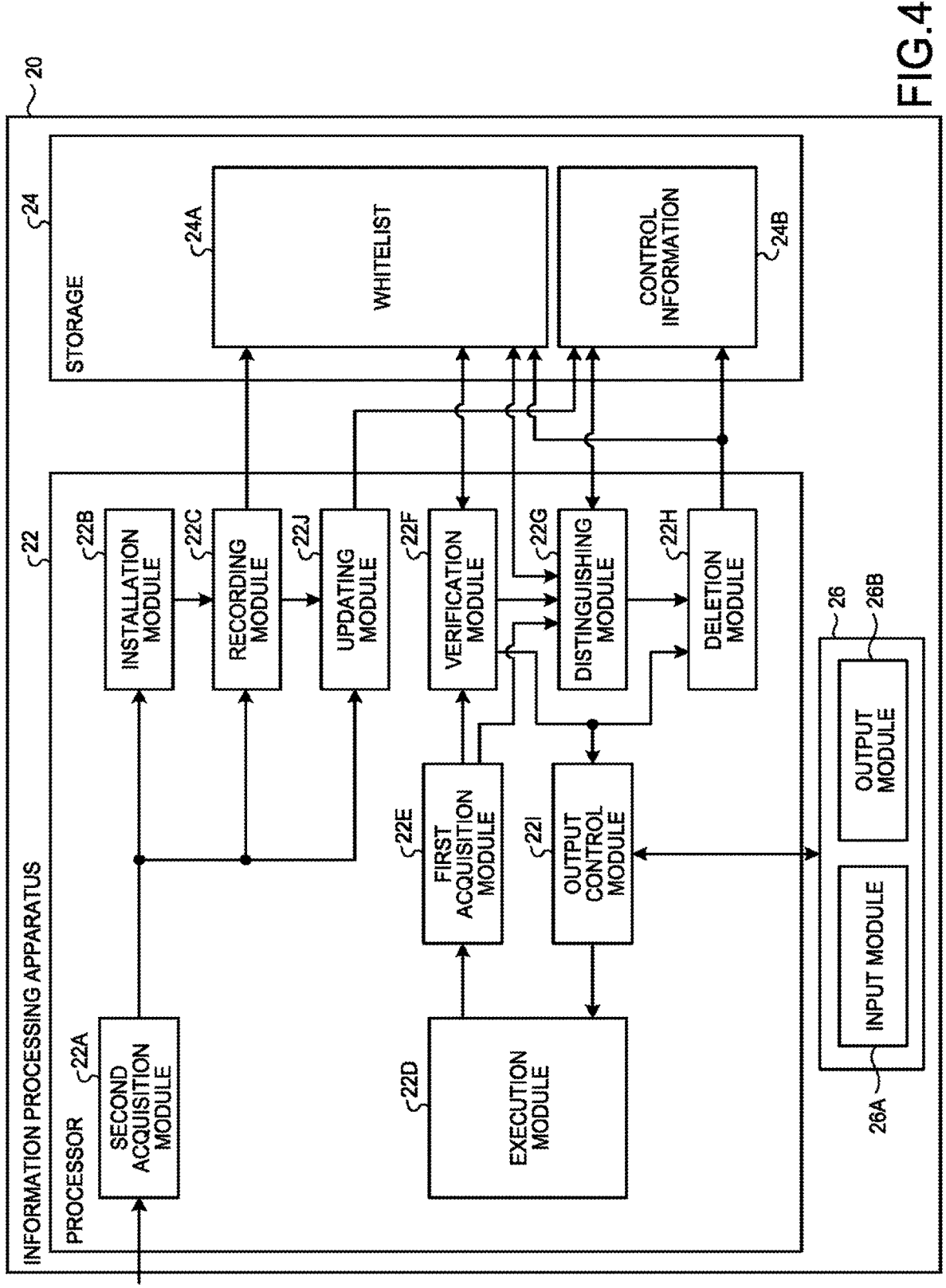
FIG. 4 is a block diagram of a functional configuration of an information processing apparatus.

The following describes the information processing apparatus 20. FIG. 4 is a block diagram of an exemplary functional configuration of the information processing apparatus 20.

The information processing apparatus 20 includes a processor 22, a storage 24, and a user interface (UI) 26. The storage 24 and the UI 26 are each connected with the processor 22 so as to be capable of transmitting and receiving data and signals.

The UI 26 outputs various types of information to an outside and receives various instructions from a user. The UI 26 includes an input module 26A and an output module 26B. The input module 26A receives various instructions from the user. The input module 26A may, for example, be a keyboard, a mouse, a touch panel, or a microphone. The output module 26B outputs various types of information to the outside. The output module 26B may, for example, be a well-known display, speaker, or light.

The storage 24 stores various types of data. In the embodiment, the storage 24 stores a whitelist 24A and control information 24B.

The whitelist 24A is a list that specifies distinctive information of pieces of software that are permitted to be executed.

FIGS. 5A and 5B are schematic diagrams of exemplary configurations of data stored in the storage 24. FIG. 5A is a schematic diagram of the exemplary data configuration of the whitelist 24A. The whitelist 24A lists distinctive information associated with respective paths and hash values.

In the whitelist 24A, the "path" represents a specific location in which the software is installed in the information processing apparatus 20. The "hash value" indicates a hash value of the software.

The distinctive information distinctively identifies a specific piece of software installed in the information processing apparatus 20. Specifically, in the embodiment, the distinctive information distinctively identifies the identification information of the software, a specific location (path) in which the software identified by the identification information is installed, and a hash value. It is here noted again that the identification information uniquely identifies the software version and software name.

Thus, in the embodiment, the whitelist 24A specifies the distinctive information that is given uniquely to each of the software installed locations (paths) and the hash values of the software that is identified by the identification information. To state the foregoing differently, the distinctive information distinctively identifies a specific piece of software that has a specific version, a specific software name, and a specific hash value and that is installed at the location specified by the path.

Values indicated by the distinctive information are required to be established in accordance with a predetermined rule. Assume, for example, the information processing apparatus 20 uses Linux (registered trademark). In this case, i-node may be used as the distinctive information. The "i-node" is file control information used by Linux. The distinctive information may be the path that indicates the software installed location. The distinctive information may even be any number given uniquely on the basis of a predetermined rule established by the information processing apparatus 20. Alternatively, the very path that indicates the software installed location or the very hash value of the software may be used for the distinctive information. Still alternatively, a very set of the path indicating the software installed location and the hash value may be used for the distinctive information.

The hash value may be a hash value of the software, or a hash value calculated from both the software and the path.

The following describes the control information 24B. The control information 24B associates the distinctive information with related distinctive information.

FIG. 5B is a schematic diagram of the exemplary data configuration of the control information 24B. The control information 24B is a list in which the distinctive information is associated with the identification information, the date of installation, and related distinctive information. The control information 24B may additionally include the date of release of the software.

The distinctive information and the identification information are as described earlier. The date of installation indicates the date on which the software that is distinctively identified by the distinctive information is installed in the information processing apparatus 20.

The related distinctive information indicates other pieces of software that are related to the software that is distinctively identified by the corresponding distinctive information. The other pieces of software that are related to the software that is distinctively identified by the corresponding distinctive information refer to other pieces of software that become unnecessary as a result of adoption of the software that is distinctively identified by the corresponding distinctive information.

The adoption of software refers to setting of the software as the software to be used in a particular process.

Examples of the other pieces of software that become unnecessary as a result of the adoption of the software that is distinctively identified by the corresponding distinctive information include, but are not limited to, another piece of software of a version (older version) earlier than the version of the software that is distinctively identified by the corresponding distinctive information, and another piece of software that is operable through operative association only with the other piece of software of the earlier version. The other pieces of software that become unnecessary as a result of the adoption of the software that is distinctively identified by the corresponding distinctive information may even be software that can be specified to be unnecessary by dependency information provided by a software generator and software that can be distinctively identified as being unnecessary by the dependency information provided by the software generator.

In the embodiment, the related distinctive information specifies the distinctive information of the other pieces of software as the information indicating the other pieces of software that are related to the software that is distinctively identified by the corresponding distinctive information.

Thus, as illustrated in FIG. 5B, the related distinctive information corresponding to the distinctive information "O1" specifies the distinctive information of "O2" and "O3" of the software of versions (Ver. 1 and Ver. 2) earlier than the software having the software name "A" and of the version "Ver. 3", distinctively identified by the distinctive information "O1".

It is noted that the embodiment assumes that the distinctive information and the distinctive information specified by the related distinctive information are established in accordance with a rule identical to a rule applicable to the distinctive information recorded in the whitelist 24A. These pieces of distinctive information are not, however, limited only to the information established in accordance with the identical rule. Specifically, the distinctive information specified in the whitelist 24A, and the distinctive information and the distinctive information specified by the related distinctive information, specified in the control information 24B, are required only to allow correspondence to be induced as to whether the pieces of distinctive information indicate the same software.

For example, the distinctive information specified in the whitelist 24A and the distinctive information specified in the control information 24B are generated by different generation rules. In this case, the information processing apparatus 20 has only to hold a separate table that indicates correspondence between the distinctive information specified in the whitelist 24A and the distinctive information specified in the control information 24B.

The whitelist 24A and the control information 24B are updated by the processor 22 (this will be detailed later).

The processor 22 controls the information processing apparatus 20. The processor 22 includes a second acquisition module 22A, an installation module 22B, a recording module 22C, an execution module 22D, a first acquisition module 22E, a verification module 22F, a distinguishing module 22G, a deletion module 22H, an output control module 22I, and an updating module 22J.

Each of the foregoing elements (the second acquisition module 22A, the installation module 22B, the recording module 22C, the execution module 22D, the first acquisition module 22E, the verification module 22F, the distinguishing module 22G, the deletion module 22H, the output control module 22I, and the updating module 22J) is achieved by, for example, one or a plurality of processors.

The foregoing elements may each be achieved, for example, by causing a central processing unit (CPU) or other type of processor to execute a program, specifically, by software. The foregoing elements may each be achieved, for example, by a dedicated integrated circuit (IC) or other type of processor, specifically, by hardware. Alternatively, the foregoing elements may each be achieved through a combined use of software and hardware. When a plurality of processors are to be incorporated, each of the processors may achieve one, or two or more of the elements.

The second acquisition module 22A acquires update information. Specifically, the second acquisition module 22A acquires the update information from the updating apparatus 10. The second acquisition module 22A outputs the update information to the installation module 22E, the recording module 22C, and the updating module 22J.

The installation module 22B installs in the information processing apparatus 20 update software included in the update information received from the second acquisition module 22A. The installation module 22B outputs to the recording module 22C a path indicating the location in which the update software has been installed.

The recording module 22C records distinctive information of the update software in the whitelist 24A. Specifically, the recording module 22C gives distinctive information to identification information included in the update information received from the second acquisition module 22A. The recording module 22C also calculates a hash value of the update software. The recording module 22C records, in the whitelist 24A, the given distinctive information, the path received from the installation module 22B, and the calculated hash value in association with each other.

Thus, the recording module 22C updates the whitelist 24A each time the second acquisition module 22A acquires update information and the installation module 22B installs update software included in the update information. Specifically, the recording module 22C records, in the whitelist 24A, the distinctive information, the path, and the hash value of the update software in association with each other.

When the whitelist 24A is updated, the updating module 22J updates the control information 24B. The updating module 22J updates the control information 24B in accordance with the update information received from the second acquisition module 22A.

Specifically, the updating module 22J records, in the control information 24B, the distinctive information of the update software recorded in the whitelist 24A by the recording module 22C, identification information, and the date of installation on which the update software is installed by the installation module 22B in association with each other.

The updating module 22J then updates the related distinctive information in the control information 24B. More specifically the updating module 22J updates the related distinctive information such that the related distinctive information recorded in the control information 24B indicates the distinctive information of the other pieces of software that become unnecessary as a result of the adoption of the software that is distinctively identified by the corresponding distinctive information.

Specifically, the updating module 22J records, in the control information 24B, the related distinctive information that indicates the motive information of the other pieces of software that become unnecessary as a result of the adoption of the update software and the distinctive information of the update software in association with each other.

More specifically, the updating module 22J searches the control information 24B for the distinctive information of the other pieces of software that become unnecessary as a result of the adoption of the update software that is included in the update information acquired by the second acquisition module 22A.

Consider, for example, that the related distinctive information indicates the distinctive information of the other pieces of software of versions earlier than the version of the software that is distinctively identified by the corresponding distinctive information. In this case, the updating module 22J searches the control information 24B for the distinctive information of, for example, the software having the same software name as the software name of the update software and of a version earlier than the version of the update software. The updating module 22J then records in the control information 24B the distinctive information found through the search operation as the related distinctive information corresponding to the distinctive information of the update software.

It is noted that the updating module 22J may search for the distinctive information of the other pieces of software using the identification information of the other pieces of software relating to the update software, included in the update information acquired via the second acquisition module 22A from the updating apparatus 10. For example, the updating module 22J searches the control information 24B for the distinctive information corresponding to the identification information of the other pieces of software, included in the update information. The updating module 22J then distinctively identifies, cut of the distinctive information found through the search operation, the distinctive information of the software having the same software name as the software name of the update software and of a version earlier than the version of the update software. The updating module 22J then records in the control information 24B the thus identified distinctive information as the related distinctive information corresponding to the distinctive information of the update software.

The update information generation module 12B of the updating apparatus 10 may generate update information that includes the related distinctive information. Specifically, the update information generation module 12B of the updating apparatus 10 may generate the related distinctive information corresponding to the update software. In this case, the updating module 22J of the information processing apparatus 20 has only to record in the control information 24B the related distinctive information included in the update information acquired via the second acquisition module 22A from the updating apparatus 10 in association with the distinctive information of the update software.

Reference is made back to FIG. 4. The execution module 22D generates processes divided in units appropriate for execution of an application and controls resources (e.g., CPU memory space, and access to external devices) required for operations of the processes. The execution module 22D executes various types of software to thereby generate the processes. The execution module 22D is, for example, a kernel of an operating system (OS).

In the embodiment, the execution module 22D outputs to the first acquisition module 22E, during execution of software, first distinctive information of a first piece of software to be executed. When a verification result received from the output control module 22I indicates execution permission, the execution module 22D executes the first piece of software. The verification result represents the result of verification of the first piece of software obtained using the whitelist 24A.

The first piece of software is exemplary software. In the embodiment, the software to be executed by the execution module 22D is referred to as the first piece of software. The first distinctive information is exemplary distinctive information. The first distinctive information distinctively identifies the first piece of software out of the distinctive information.

The first acquisition module 22E acquires the first distinctive information of the first piece of software to be executed. The first acquisition module 22E acquires the first distinctive information from the execution module 22D. The first acquisition module 22E outputs the acquired first distinctive information to the verification module 22F and the distinguishing module 22G.

The verification module 22F determines whether the distinctive information indicating the first distinctive information received from the first acquisition module 22E is recorded in the whitelist 24A. If the distinctive information is recorded in the whitelist 24A, the verification module F generates a verification result indicating execution permission.

More specifically, if the first distinctive information is recorded in the whitelist 24A, the verification module 22F calculates a hash value of the first piece of software stored in the location that is distinctively identified by the path included in the first distinctive information. When the hash value corresponding to the distinctive information that indicates the first distinctive information in the whitelist 24A matches the calculated hash value, the verification module 22F generates the verification result indicating the execution permission. When there is a mismatch in the hash values, the verification module 22F generates a verification result indicating execution prohibition. If it is determined that the distinctive information indicating the first distinctive information received from the first acquisition module 22E is not recorded in the whitelist 24A, the verification module 22F also generates the verification result indicating execution prohibition.

The output control module 22I outputs to the execution module 22D and the UI 26 the verification result received from the verification module 22F. If the verification result received from the verification module 22F indicates execution permission, the execution module 22D executes the first piece of software. If the verification result received from the verification module 22F indicates execution prohibition, the execution module 22D does not execute the first piece of software.

If the distinctive information indicating the first distinctive information is recorded in the whitelist 24A, the distinguishing module 22G distinctively identifies as second distinctive information the distinctive information of the second piece of software that represents another software relating to the first piece of software in the whitelist 24A.

The distinctive information indicating the first distinctive information denotes the distinctive information having a value identical to the value of the first distinctive information. The second piece of software is exemplary software. The second piece of software represents other pieces of software relating to the first piece of software among other pieces of software. The other pieces of software relating to the first piece of software are related to the first piece of software, but are any pieces of software other than the first piece of software.

The second distinctive information is exemplary distinctive information. The second distinctive information represents the distinctive information of the second piece of software that is related to the first piece of software to be executed.

Specifically, in the embodiment, if the first distinctive information is recorded in the whitelist 24A, the distinguishing module 22G distinctively identifies the second distinctive information of the second piece of software in the whitelist 24A.

For example, the distinguishing module 22G distinctively identifies the second distinctive information of the second piece of software in the whitelist 24A as the second distinctive information subjected to monitoring. In the embodiment, the information "subjected to monitoring" means that the information is subjected to processing of some sort. Specifically, the information may be subjected, for example, to deletion from the whitelist, to saving from the whitelist, and to warning during execution. The embodiment will be described exemplarily as being subjected to deletion from the whitelist.

In the embodiment, the distinguishing module 22G distinctively identifies the second distinctive information using the control information 24B. The distinguishing module 22G reads from the control information 24B the related distinctive information corresponding to the distinctive information indicating the first distinctive information. Then, the distinguishing module 22G distinctively identifies from the whitelist 24A the distinctive information indicated in the read related distinctive information. The distinguishing module 22G thereby distinctively identifies the second distinctive information in the whitelist 24A.

The distinguishing module 22G outputs the distinctively identified second distinctive information to the deletion module 22H.

The deletion module 22H deletes from the whitelist 24A information relating to the second distinctive information.

The information relating to the second distinctive information in the whitelist 24A denotes the distinctive information indicating second distinctive information and information associated with the distinctive information (in the embodiment, the path and the hash value) in the whitelist 24A.

Specifically, in the embodiment, the deletion module 22H deletes, from the whitelist 24A, the distinctive information indicating the second distinctive information and the path and the hash value associated with the distinctive information in the whitelist 24A.

Thus, in the embodiment, if the first distinctive information is recorded in the whitelist 24A, information relating to the second piece of software that becomes unnecessary as a result of the adoption of the first piece of software is deleted from the whitelist 24A.

It is here noted that, if the first distinctive information is recorded in the whitelist 24A and the verification result of the first piece of software obtained using the whitelist 24A indicates execution permission, the deletion module 22H may delete information relating to the second distinctive information from the whitelist 24A.

Alternatively, the deletion module 22H may delete the information relating to the second distinctive information from the whitelist 24A, if the first distinctive information is recorded in the whitelist 24A, the verification result of the first piece of software obtained using the whitelist 24A indicates execution permission, and if the execution module 22D has executed the first piece of software.

Additionally, the deletion module 22H deletes information relating to the second distinctive information in the control information 24B. The information relating to the second distinctive information in the control information 24A refers to the distinctive information indicating the second distinctive information and other pieces of information (in the embodiment, the identification information, the date of installation, and the related distinctive information) associated with distinctive information and recorded in the control information 24B.

Figure 6:
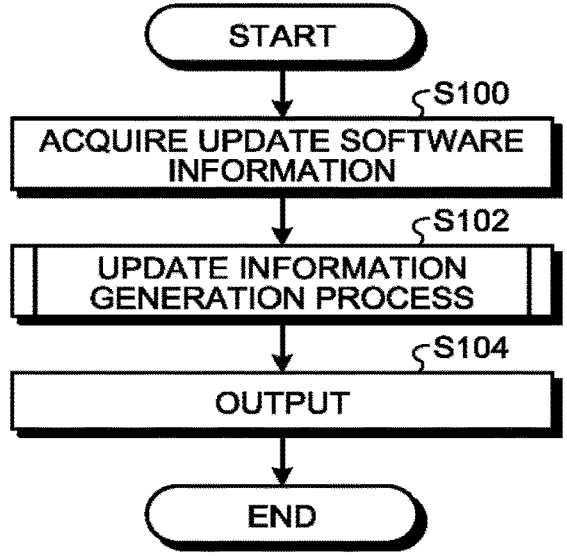
FIG. 6 is a flowchart illustrating a procedure of an information processing process.

The following describes a procedure of an information processing process performed by the updating apparatus 10 in the embodiment. FIG. 6 is a flowchart illustrating a procedure of an exemplary information processing process performed by the updating apparatus 10 in the embodiment.

The acquisition module 12A acquires the update software information 14A (Step S100). The update information generation module 12B performs an update information generation process (Step S102). The output module 12C then outputs to the information processing apparatus 20 the update information generated at Step S102 (Step S104). This routine is terminated.

Figure 7:
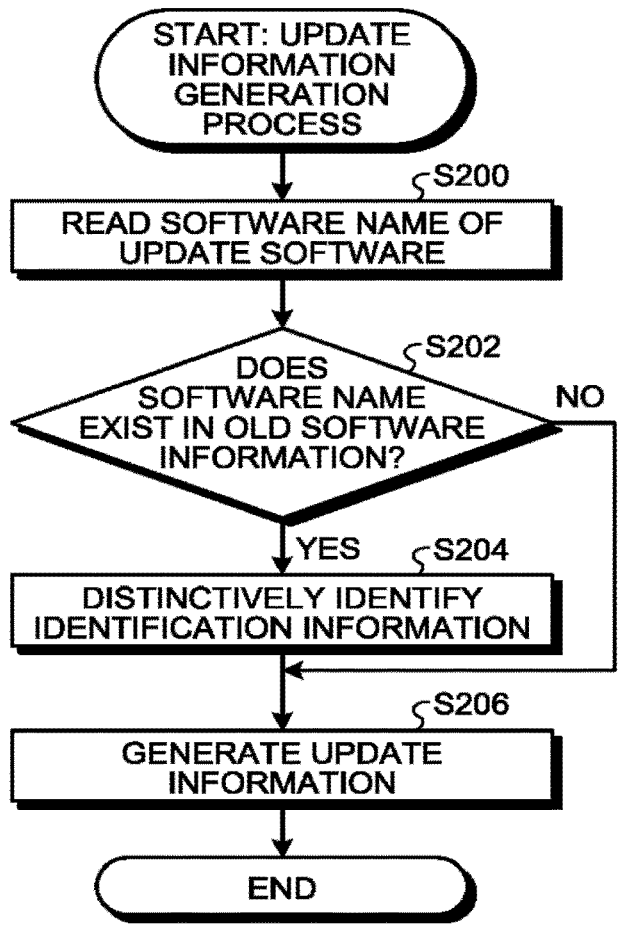
FIG. 7 is a flowchart illustrating a procedure of an update information generation process.

The following describes a procedure of an exemplary update information generation process at Step S102 in FIG. 6. FIG. 7 is a flowchart illustrating the procedure of the exemplary update information generation process.

The update information generation module 12B reads the software name of the update software included in the acquired update software information 14A (Step S200). The update information generation module 12B determines whether the software name read at Step 6200 exists in the old software information 14B (Step S202). If an affirmative determination is made at Step S202 (Yes at Step S202), Step S204 is then performed.

At Step S204, the update information generation module 12B distinctively identifies in the old software information 14B the identification information of the software having the software name identical to the software name of the update software (Step S204). Then, the flow proceeds to Step S206.

If a negative determination is made at Step S202 (No at Step S202), the identification information is left blank and the flow proceeds to Step S206.

At Step S206, the update information generation module 12B generates the update information that includes the update software included in the update software information 14A acquired at Step S100 (see FIG. 6) and the identification information distinctively identified at Step S204 (Step S206). This routine is then terminated.

The following describes information processing processes performed by the information processing apparatus 20. The information processing apparatus 20 performs, for information processing, an updating process through which the whitelist 24A and the control information 24B are updated and a distinguishing process through which the second distinctive information is distinctively identified.

Figure 8:
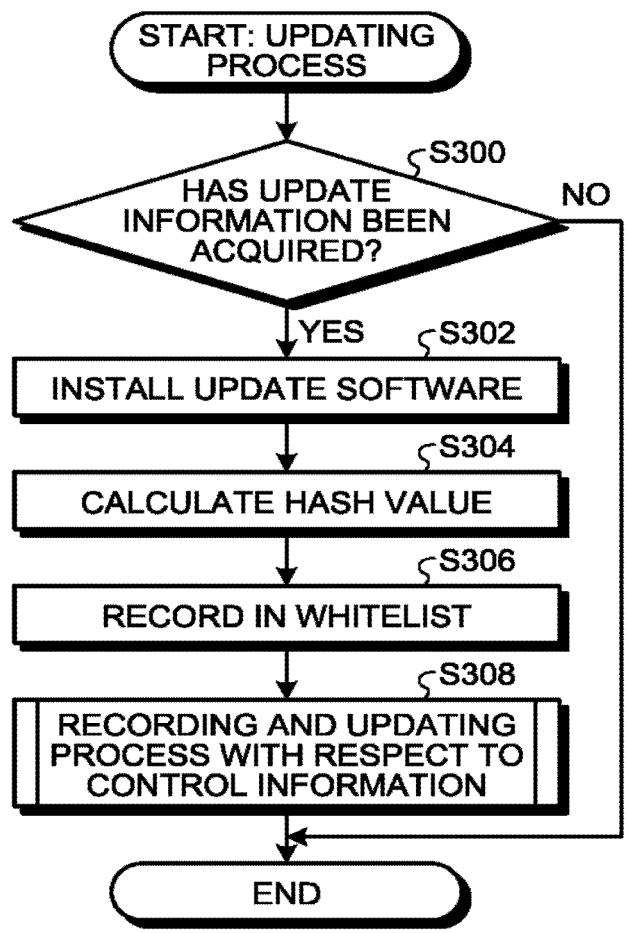
FIG. 8 is a flowchart illustrating a procedure of an updating process.

The following describes a procedure of an exemplary updating process performed by the information processing apparatus 20. FIG. 8 is a flowchart illustrating the procedure of the exemplary updating process performed by the information processing apparatus 20.

It is first determined whether the second acquisition module 22A has acquired update information from the updating apparatus 10 (Step S300). If a negative determination is made at Step 2300 (No at Step S300), this routine is terminated. If an affirmative determination is made at Step S300 (Yes at Step S300), Step S302 is then performed.

At Step S302, the installation module 22B installs the update software included in the update information acquired at Step S300 (Step S302).

It is noted that the installation module 22B may inspect the update information before determining whether updating is necessary. The installation module 22B may install the update software, if it is determined that the updating needs to be made. The installation module 22B may terminate this routine, if it is determined that the updating should not be made.

To determine whether the updating needs to be made, a well-known method can be used. Assume, for example, that the update information further includes a digital signature. In this case, the installation module 22B has only to determine whether the digital signature included in the update information is authentic before determining whether the updating is necessary.

The recording module 22C calculates the hash value of the update software included in the update information acquired at Step S300 (Step S304). The recording module 22C has only to use a predetermined hash function to calculate the hash value.

The recording module 22C records, in the whitelist 24A, distinctive information, the path that indicates the location in which the update software is installed at Step S302, and the hash value calculated at Step S304 in association with each other (Step S306).

The updating module 22J performs a recording and updating process with respect to the control information 24B (Step S308). This routine is then terminated.

Figure 9:
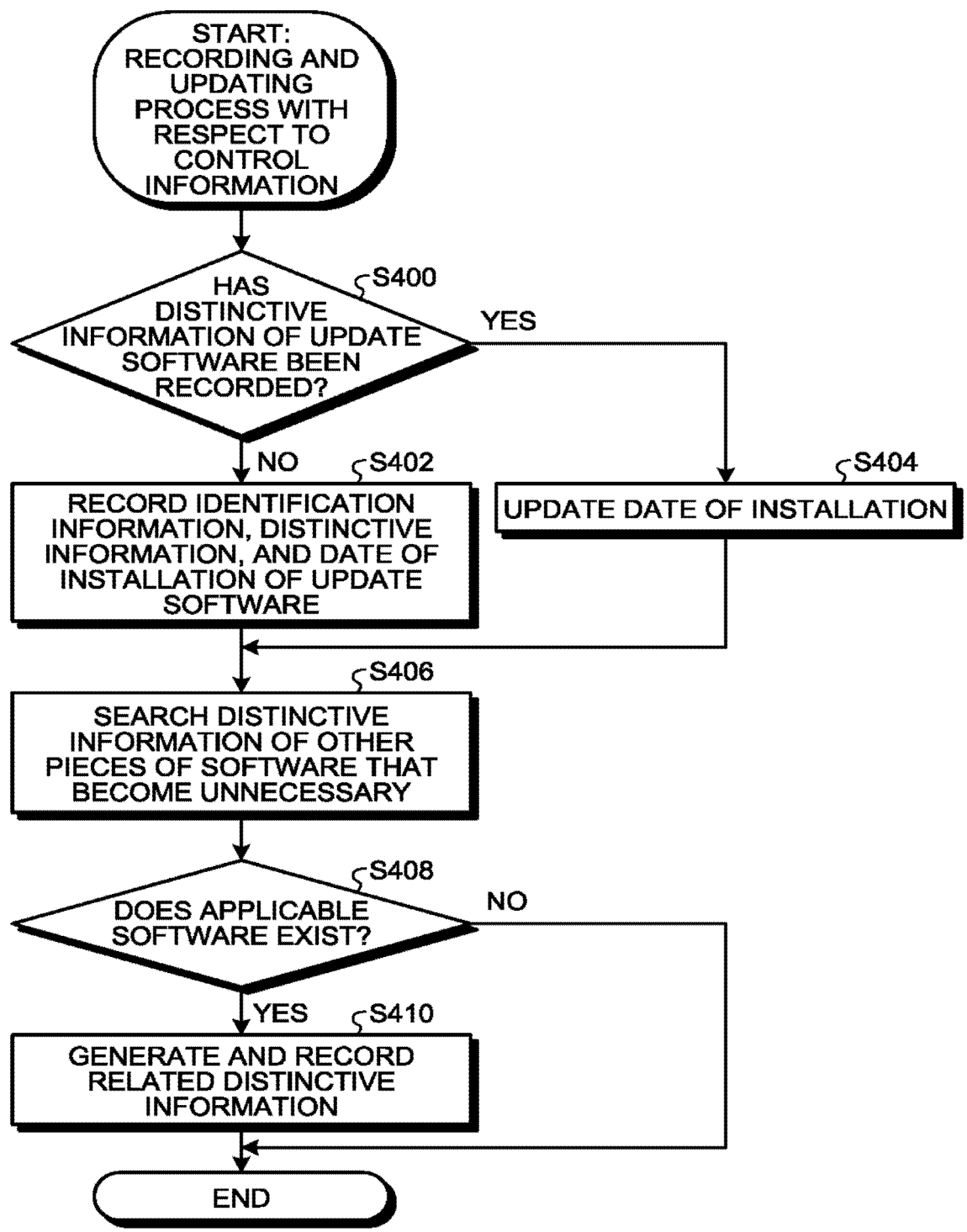
FIG. 9 is a flowchart illustrating a procedure of a recording and updating process.

The following describes a procedure of an exemplary recording and updating process performed by the updating module 22J at Step S308 in FIG. 8. FIG. 9 is a flowchart illustrating the procedure of the exemplary recording and updating process performed by the updating module 22J.

The updating module 22J determines whether the distinctive information of the update software has been recorded in the control information 24B (Step S400). Specifically, the updating module 22J determines whether the distinctive information recorded in the whitelist 24A at Step S306 (see FIG. 9) has been recorded in the control information 24B.

If a negative determination is made at Step S400 (No at Step S400), Step S402 is then performed. At Step S402, the updating module 22J records, in the control information 24B, the distinctive information, the identification information, and the date of installation of the update software recorded in the whitelist 24A at Step S306 in association with each other (Step S402). Then, the flow proceeds to Step S406.

If an affirmative determination is made at Step S400 (Yes at Step S400), Step S404 is then performed. At Step S404, the updating module 22J updates the date of installation by replacing the date of installation associated with the distinctive information, recorded at Step S306 (see FIG. 8), with the date of installation at Step S302 (see FIG. 8) (Step S404). Then, the flow proceeds to Step S406.

At Step S406, the updating module 22J searches the control information 24B for the distinctive information of other pieces of software that become unnecessary as a result of the adoption of the update software included in the update information acquired at Step S300 (see FIG. 8) (Step S406). If any applicable software exists (Yes at Step S408), Step S410 is then performed.

At Step S410, the updating module 22J generates related distinctive information and records the related distinctive information in the control information 243 (Step S410). For example, the updating module 22J searches the control information 24B for the distinctive information of the software having the same software name as the software name of the update software and of a version earlier than the version of the update software. The updating module 22J then records in the control information 24B the distinctive information found through the search operation as the related distinctive information corresponding to the distinctive information of the update software.

Then, this routine is terminated. If no applicable software exists (No at Step S408), this routine is terminated.

Figure 10:
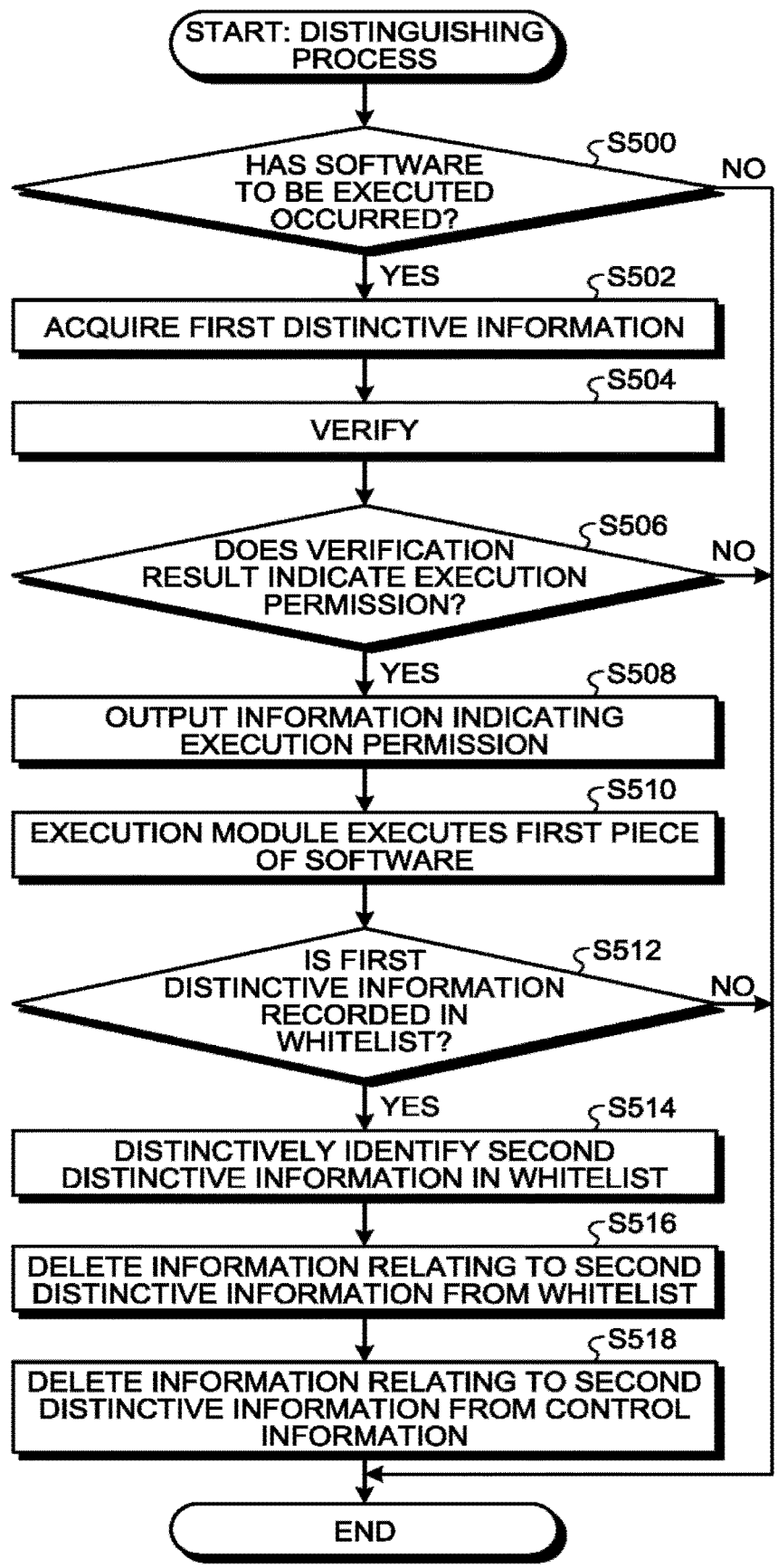
FIG. 10 is a flowchart illustrating a procedure of a distinguishing process.

The following describes a procedure of an exemplary distinguishing process for distinctively identifying the second distinctive information. FIG. 10 is a flowchart illustrating the procedure of the exemplary distinguishing process performed by the information processing apparatus 20.

The execution module 223 determines whether the first piece of software to be executed has occurred (Step S500). If the first piece of software to be executed has not occurred (No at Step S500), this routine is terminated. If the first piece of software to be executed has occurred (Yes at Step S500), the execution module 223 outputs to the first acquisition module 22E the first distinctive information of the first piece of software.

The first acquisition module 22E accordingly acquires the first distinctive information (Step S502). In the embodiment, the first acquisition module 22E acquires the first distinctive information that is specified by the identification information (software name, version information) of the first piece of software to be executed and the path that indicates the location in which the first piece of software is stored.

The verification module 22F verifies, using the whitelist 24A, whether execution is permitted for the first piece of software that is distinctively identified by the first distinctive information acquired by the first acquisition module 22E (Step S504). For example, the verification module 22F calculates the hash value of the first piece of software a is stored in the location distinctively identified by the path included in the first distinctive information. When the hash value corresponding to the distinctive information that indicates the first distinctive information in the whitelist 24A matches the calculated hash value, the verification module 22F generates a verification result indicating execution permission. When there is a mismatch in the hash values, the verification module 22F generates a verification result indicating execution prohibition.

If the verification result at Step S504 indicates execution prohibition (No at Step S506), this routine is terminated. If the verification result at Step S504 indicates execution permission (Yes at Step S506), the flow proceeds to Step S508.

At Step S508, the output control module 25I outputs the information indicating execution permission via the output module 26B (Step S508). It is noted that Step S508 may be omitted.

The execution module 22D executes the first piece of software (Step S510). Specifically, if the verification result indicates execution permission, the execution module 22D executes the first piece of software.

The distinguishing module 22G determines whether the distinctive information indicating the first distinctive information is recorded in the whitelist 24A (Step S512). If the distinctive information indicating the first distinctive information is not recorded at Step S512), this routine is terminated. If the distinctive information indicating the first distinctive information is recorded (Yes at Step S512), then the flow proceeds to Step S514.

At Step S514, the distinguishing module 22G distinctively identifies a the second distinctive information the distinctive information of the second piece of software that represents another software relating to the first piece of software in the whitelist 24A (Step S514).

The deletion module 22H deletes from the whitelist 24A the information relating to the second distinctive information distinctly identified at Step S514 (Step S516).

The deletion module 22H deletes from the control information 24B the information relating to the second distinctive information distinctly identified at Step S514 (Step S518). Then, this routine is terminated.

As described above, the information processing apparatus 20 in the embodiment includes the first acquisition module 22E and the distinguishing module 22G. The first acquisition module 22E acquires the first distinctive information of the first piece of software to be executed. If the distinctive information indicating the first distinctive information is recorded in the whitelist 24A that specifies the distinctive information of the software that is permitted to be executed, the distinguishing module 22G distinctively identifies as the second distinctive information the distinctive information of the second piece of software that represents another piece of software relating to the first piece of software in the whitelist 24A.

As such, if the first distinctive information of the first piece of software to be executed is recorded in the whitelist 24A, the information processing apparatus 20 in the embodiment distinctively identifies the second distinctive information of the second piece of software relating to the first piece of software in the whitelist 24A.

Thus, only when the first distinctive information of the first piece of software to be executed is recorded in the whitelist 24A, the information processing apparatus 20 in the embodiment can distinctively identify the second distinctive information of the second piece of software relating to the first piece of software as the software subjected to various types of processing including monitoring and deletions.

Thus, when the first distinctive information of the first piece of software to be executed is yet to be recorded in the whitelist 24A, the information processing apparatus 20 in the embodiment can prevent the second piece of software relating to the first piece of software from being subjected to the various types of processing including monitoring and deletion. Specifically, the information processing apparatus 20 in the embodiment can prevent both the first piece of software and the second piece of software from becoming inexecutable.

The information processing apparatus 20 in the embodiment thus can maintain availability of the information processing apparatus 20 in which the whitelist 24A is incorporated.

The information processing apparatus 20 in the embodiment causes the deletion module 22H to delete from the whitelist 24A the second distinctive information distinctively identified by the distinguishing module 22G.

Thus, the information processing apparatus 20 in the embodiment can achieve security of the information processing apparatus 20, while achieving the abovementioned effect.

It is noted that the update information received from the updating apparatus 10 by the second acquisition module 22A may further include monitoring information. The monitoring information indicates distinctive information of the software subjected to monitoring. Still, the monitoring information map indicate identification information of the software subjected to monitoring.

In this case, the update information generation module 12B of the updating apparatus 10 has only to generate the update information that further includes the monitoring information. For example, the update information generation module 12B distinctively identifies compromised software among the pieces of software recorded in the old software information 14B. The update information generation module 12B may, for example, distinctively identify as the compromised software those pieces of software with which a predetermined period of time or longer has elapsed since the transmission to the information processing apparatus 20 and those pieces of software that have not been executed by the information processing apparatus 20 for a predetermined period of time or longer.

The update information generation module 12B may, for example, acquire from the information processing apparatus 20 the distinctive information of the software that has not been executed by the information processing apparatus 20 for a predetermined period of time or linger and the distinctive information of the software with which a predetermined period of time or longer has elapsed since the installation. Thus, using the information received from the information processing apparatus 20, the update information generation module 12B has only to distinctively identify the compromised software.

The update information generation module 12E then has only to transmit to the information processing apparatus 20 update information that includes the monitoring information indicating the distinctive information of the compromised software.

In this case, the distinguishing module 22G of the information processing apparatus 20 has only to distinctively identify the second distinctive information by following the manner similar to the manner described earlier, and further distinctively identifies as the second distinctive information the distinctive information indicated in the monitoring information.

The embodiment has been described so as to control the whitelist 24A and the control information 24B as separately provided tables. The whitelist 24A and the control information 24B may nonetheless be controlled as being consolidated into a single table.

First Modification

The above embodiment has been described for the mode of control by which the output control module 21I outputs the verification result produced by the verification module via the output module 26B. The output control module 22I may nonetheless output via the output module 26B additional information.

When, for example, the first distinctive information acquired by the first acquisition module 22E matches the second distinctive information distinctively identified in the past by the distinguishing module 22G, the output control module 22I may output to the output module 26B warning information.

In this case, as in thio above-described embodiment, if the distinctive information indicating the first distinctive information is recorded in the whitelist 24A, the distinguishing module 22G distinctively identifies the second distinctive information of the second piece of software relating to the first piece of software in the whitelist 24A. The distinguishing module 22G further assigns a flag indicating that the second distinctive information has been distinctively identified such that the flag is associated with the distinctively identified second distinctive information.

For example, the whitelist 24A may be configured as additionally associating the flag with the distinctive information. The flag may, for example, be a "1" when the second distinctive information has been distinctively identified and a "0" when the second distinctive information has not been distinctively identified.

The distinguishing module 22G changes the flag corresponding to the distinctive information distinctively identified as the second distinctive information to a "1" in the whitelist 24A. It is noted that, in the following, the flag is a "1" when the flag has been assigned.

When the flag is assigned to the first distinctive information of the first piece of software verified by the verification module 22F, the output control module 22I determines that the first distinctive information matches the second distinctive information that was distinctively identified in the past. When the first distinctive information acquired by the first acquisition module 22E matches the second distinctive information distinctively identified in the past by the distinguishing module 22G, the output control module 22I outputs the warning information to the output module 26B. The warning information is only required to indicate that the acquired first distinctive information was identified in the past as the second distinctive information.

The output module 26B outputs the warning information. The output module 26B may, for example, output sound indicating the warning information, a display screen indicating the warning information, or light indicating the warning information.

It is noted that, in the first modification, the deletion module 22H is not required to perform a process to delete information relating to the second distinctive information. Alternatively, the deletion module 22H may delete from the whitelist 24A, for each predetermined period of time, information relating to the second distinctive information to which the flag indicating that the second distinctive information has been distinctively identified is assigned in the whitelist 24A.

In the first modification, the information processing apparatus 20 performs the updating process as in the above-described embodiment (see FIGS. 8 and 9). Meanwhile, in the first modification, preferably, the information processing apparatus 20 performs a distinguishing process illustrated in FIG. 11.

Figure 11:
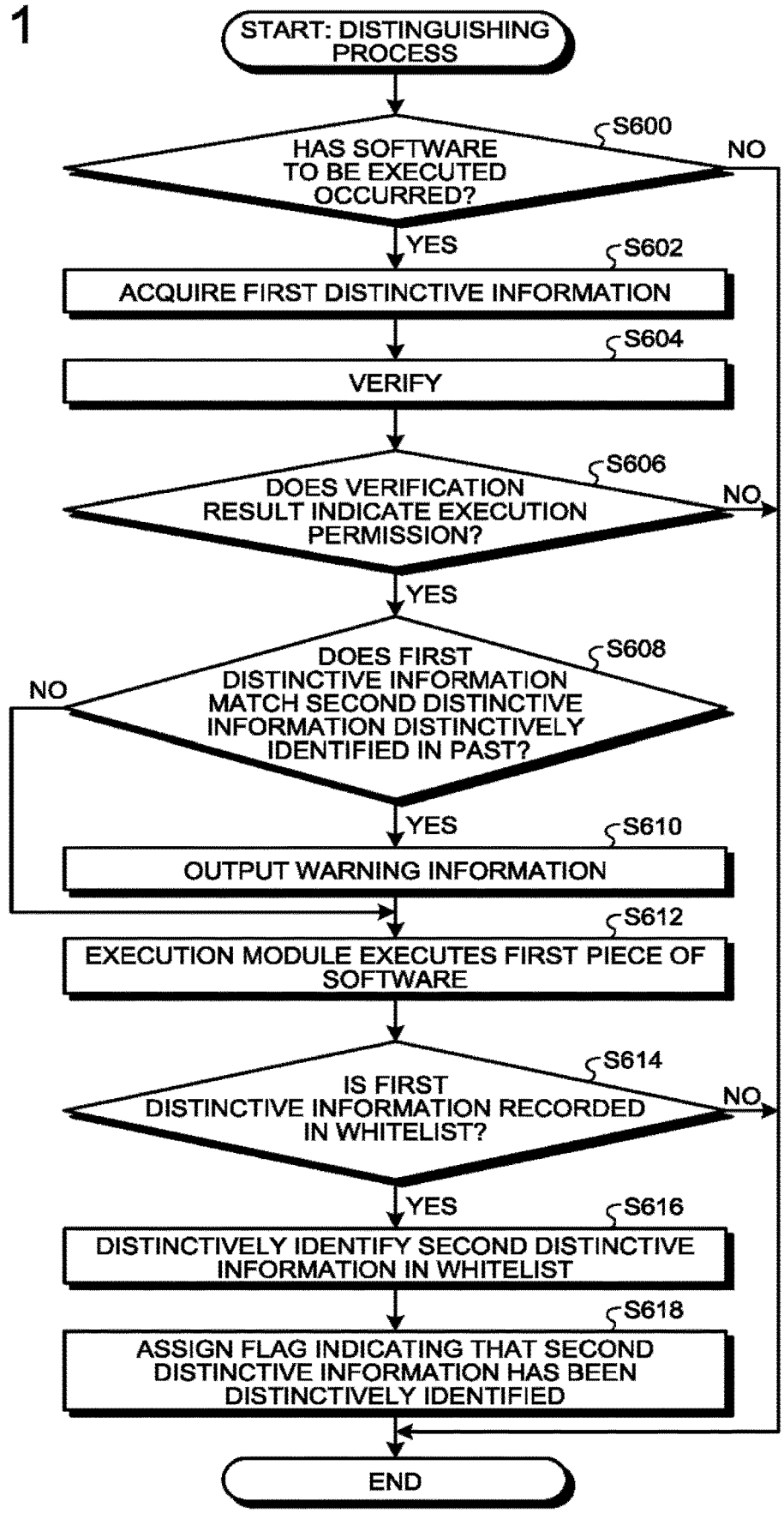
FIG. 11 is a flowchart illustrating a procedure of a distinguishing process.

FIG. 11 is a flowchart illustrating a procedure of an exemplary distinguishing process performed by the information processing apparatus 20 in the first modification.

In the first modification, the information processing apparatus 20 performs Step S600 to Step S606 in the same manner as at Step S500 to Step S506 in the above-described embodiment (see FIG. 10). If a negative determination is made at Step S606 (No at Step S606), this routine is terminated.

If an affirmative determination is made at Step S606 (Yes at Step S606), Step S608 is then performed.

At Step S608, the output control module 22I determines whether the first distinctive information acquired by the first acquisition module 22E matches the second distinctive information distinctively identified in the past (Step S608). If the first distinctive information acquired by the first acquisition module 22E matches the second distinctive information distinctively identified in the past (Yes at Step S608), Step S610 is then performed. At Step S610, the output control module 22I outputs the warning information via the output module 26B (Step S610). Then, the flow proceeds to Step S612. If a negative determination is made at Step S608 (No at Step S606), Step S612 is then performed.

The execution module 22D executes the first piece of software (Step S612). The distinguishing module 22G then determines whether the distinctive information indicating the first distinctive information is recorded in the whitelist 24A (Step S614). If the distinctive information is not recorded (No at Step S614), this routine is terminated. If the distinctive information is recorded (Yes at Step S614), Step S616 is then performed.

At Step S616, the distinguishing module 22G distinctively identifies as the second distinctive information the distinctive information of the second piece of software that represents another software relating to the first piece of software in the whitelist 24A (Step 2616).

The distinguishing module 22G assigns to the second distinctive information distinctively identified at Step S616 the flag indicating that the second distinctive information has been distinctively identified (Step S618). Then, this routine is terminated.

As described above, as in the above-described embodiment, when the first distinctive information of the first piece of software to be executed is recorded in the whitelist 24A, the information processing apparatus 20 in the first modification distinctively identifies the second distinctive information of the second piece of software relating to the first piece of software in the whitelist 24A. In the information processing apparatus 20 in the first modification, when the first distinctive information matches the second distinctive information distinctively identified in the past, the output control module 22I outputs the warning information to the output module 26B.

The information processing apparatus 20 in the first modification thus can achieve an effect similar to the effect achieved by the information processing apparatus 20 in the above-described embodiment, while further preventing availability from being reduced.

Second Modification

The above embodiment has been described for the mode of control by which the output control module 22I outputs the verification result produced by the verification module via the output module 26B. The output control module 22I may additionally control the execution module 22D such that the execution module 22D holds execution of the first piece of software.

For example, when the first distinctive information acquired by the first acquisition module 22E matches the second distinctive information distinctively identified by the distinguishing module 22G in the past, the output control module 22I may control the execution module 22D so as to hold execution of the first piece of software, and output the warning information to the output module 26B.

The execution module 22D has only to execute the first piece of software upon receipt of an execution instruction with respect to the warning information.

In this case, as in the above-described embodiment, when the distinctive information indicating the first distinctive information is recorded in the whitelist 24A, the distinguishing module 22G distinctively identifies the second distinctive information of the second piece of software relating to the first piece of software in the whitelist 24A. Then, as in the first modification, the distinguishing module 22G assigns a flag indicating that the second distinctive information has been distinctively identified such that the flag is associated with the distinctively identified second distinctive information.

When a flag is assigned to the first distinctive information of the first piece of software that has been verified by the verification module 22F, the output control module 22I determines that the first distinctive information matches the second distinctive information that was distinctively identified in the past. When the first distinctive information acquired by the first acquisition module 22E matches the second distinctive information distinctively identified by the distinguishing module 22G in the past, the output control module 22I outputs the warning information to the output module 26B.

In this case, the output control module 22I controls the execution module 22D such that the execution module 22D holds execution of the first piece of software. For example, the output control module 22I has only to hold the verification result received from the verification module 22F until the execution instruction is received and, when the execution instruction is thereafter received, the output control module 22I may output the verification result to the execution module 22D.

The output control module 22I has only to receive the execution instruction from the input module 26A. For example, the output control module 22I outputs the warning information to the output module 26B. The user determines information output from the output module 26E and operates to instruct the input module 26A. Through this operating instruction, the user operates to input an execution instruction that indicates execution of the first piece of software or an execution-prohibited instruction that indicates execution prohibition. The input module 26A outputs the received execution instruction or execution-prohibited instruction to the output control module 22I.

When the execution-prohibited instruction is received, the output control module 22I has only to output the verification result of the verification module 22E to the execution module 22D.

It is noted that, in the second modification, the deletion module 22H is not necessarily required to perform the process to delete information relating to the second distinctive information.

In the second modification, the information processing apparatus 20 performs the updating process in the same manner as in the above-described embodiment. (see FIGS. 8 and 9). Meanwhile, in the second modification, preferably, the information processing apparatus 20 performs a distinguishing process illustrated in FIG. 12.

Figure 12:
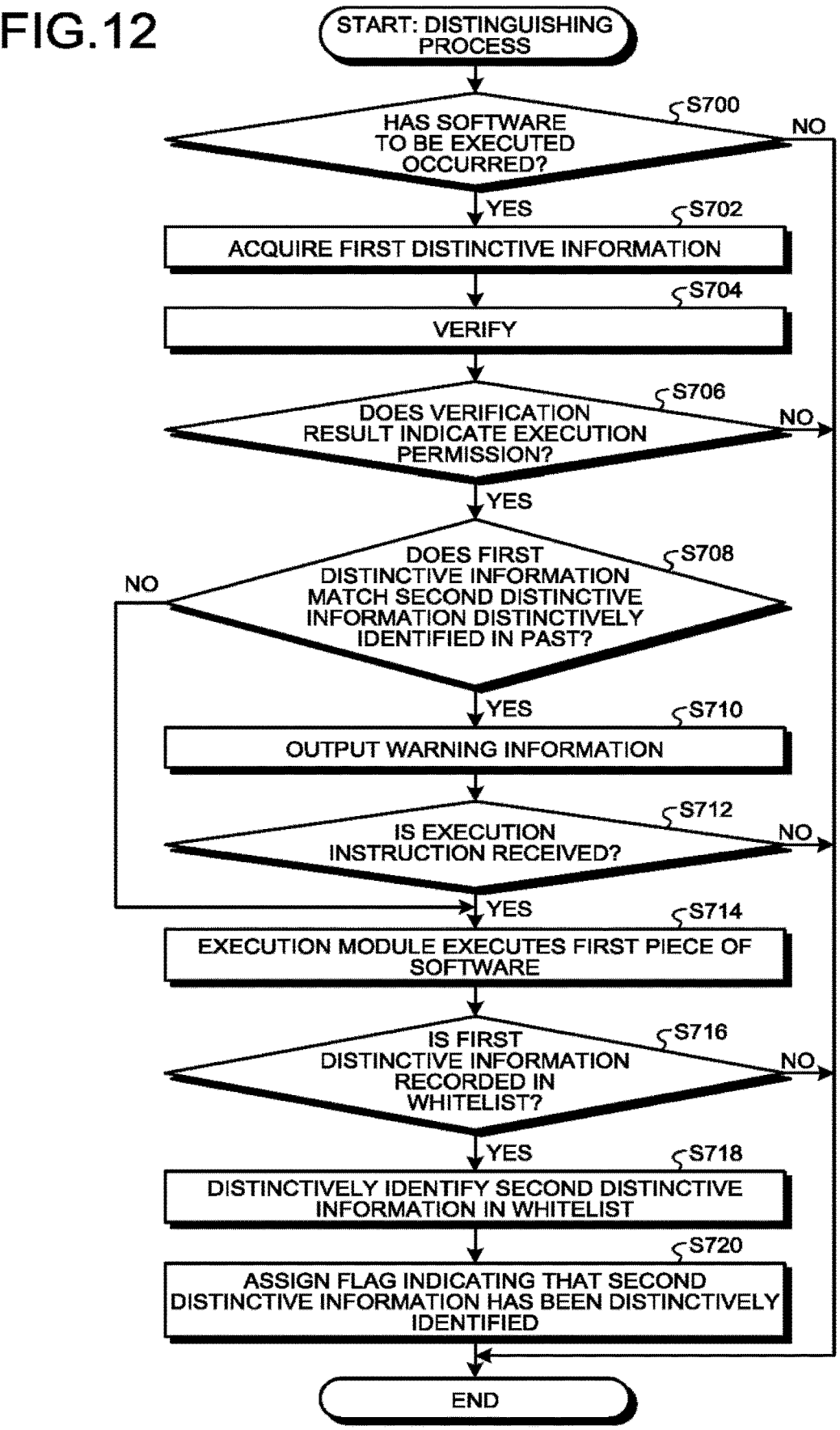
FIG. 12 is a flowchart illustrating a procedure of a distinguishing process.

FIG. 12 is a flowchart illustrating a procedure of an exemplary distinguishing process performed by the information processing apparatus 20 in the second modification.

In the second modification, the information processing apparatus 20 performs Step S700 to Step S706 in the same manner as at Step S500 to Step S506 in the above-described embodiment (see FIG. 10). If a negative determination is made at Step S206 (No at Step S706), this routine is terminated.

If an affirmative determination is made at Step S706 (Yes at Step S706), Step S708 is then performed.

At Step S708, the output control module 22I determines whether the first distinctive information acquired by the first acquisition module 22E matches the second distinctive information that was distinctively identified in the past (Step S708). If the first distinctive information acquired by the first acquisition module 22E does not match the second distinctive information that was distinctively identified in the past (No at Step S708), Step S714 is then performed.

If the first distinctive information acquired by the first acquisition module 22E matches the second distinctive information that was distinctively identified in the past (Yes at Step S708), Step S710 is then performed. At Step 10, the output control module 22I outputs the warning information via the output module 265 (Step S710).

The output control module 22I next determines whether the execution instruction is received from the input module 26A (Step S712). If the execution instruction is received (Yes at Step S712), the flow proceeds to Step S714. If the execution-prohibited instruction is received (No at Step S712), this routine is terminated.

At Step S714, the execution module 22D executes the first piece of software (Step S714). The distinguishing module 22G determines whether the whitelist 24A records the distinctive information indicating the first distinctive information (Step S716). If the distinctive information is not recorded in the whitelist 24A (No at Step S716), this routine is terminated. If the distinctive information is recorded in the whitelist 24A (Yes at Step S716), Step S718 is then performed.

At Step S718, the distinguishing module 22G distinctively identifies as the second distinctive information the distinctive information of the second piece of software that represents another software relating to the first piece of software in the whitelist 24A (Step S718).

The distinguishing module 22G assigns to the second distinctive information distinctively identified at Step S718 the flag indicating that the second distinctive information has been distinctively identified (Step S720). Then, this routine is terminated.

As described above, as in the above-described embodiment, when the first distinctive information of the first piece of software to be executed is recorded in the whitelist 24A, the information processing apparatus 20 in the second modification distinctively identifies the second distinctive information of the second piece of software relating to the first piece of software in the whitelist 24A. In the information processing apparatus 20 in the second modification, when the first distinctive information matches the second distinctive information distinctively identified in the past, the output control module 22I controls the execution module 22D such that the execution module 22D holds execution of the first piece of software and outputs the warning information to the output module 26B. The execution module 22D executes the first piece of software upon receipt of the execution instruction with respect to the warning information.

The information processing apparatus 20 in the second modification thus can achieve the effect similar to the effect achieved by the information processing apparatus 20 in the above-described embodiment, while further preventing availability from being reduced. Additionally, the information processing apparatus 20 in the second modification can enhance a security level of the information processing apparatus 20.

Figure 13:
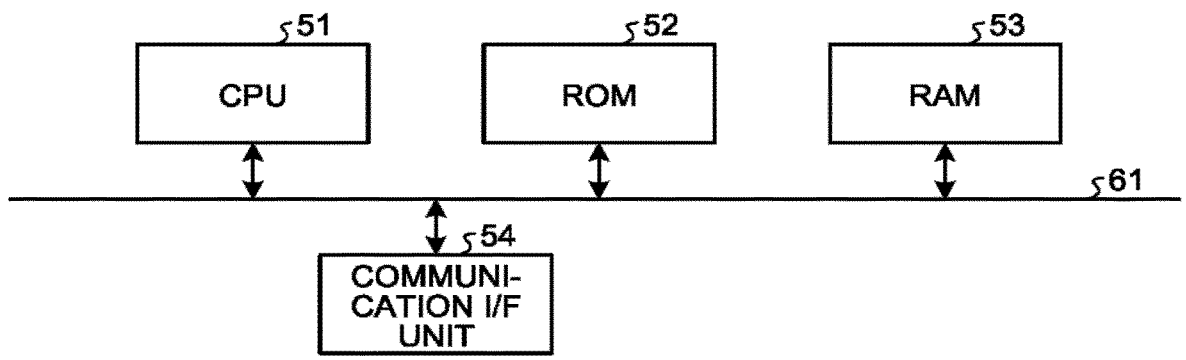
FIG. 13 is a hardware configuration diagram.

The following describes an exemplary hardware configuration of the updating apparatus 10 and the information processing apparatus 20 in the embodiment and the first and second modifications described above. FIG. 13 is an exemplary hardware configuration diagram of the updating apparatus 10 and the information processing apparatus 20 in the embodiment and the first and second modifications described above.

The updating apparatus 10 and the information processing apparatus 20 in the embodiment and the first and second modifications described above each have a hardware configuration incorporating an ordinary computer and each include a control unit such as a central processing unit (CPU) 51, a storage unit such as a read only memory (ROM) 52, a random access memory (RAM) 53, and a hard disk drive (HOD), a communication I/F unit 54 that serves as an interface with respect to various types of devices, and a bus 61 that connects the foregoing different elements.

In the updating apparatus 10 and the information processing apparatus 20 according to the embodiment and the first and second modifications described above, the CPU 51 loads a program from the ROM 52 onto the RAM 53 and executes the program. This achieves each of the above-described functions on the computer.

The program for executing each of the different processes performed by the updating apparatus 10 and the information processing apparatus 20 according to the embodiment and the first and second modifications described above may be stored in the HDD. Alternatively, the program for executing each of the different processes performed by the updating apparatus 10 and the information processing apparatus 20 according to the embodiment and the first and second modifications described above may be incorporated in advance in the ROM 52 and provided.

The program for executing each of the different processes performed by the updating apparatus 10 and the information processing apparatus 20 according to the embodiment and the first and second modifications described above may be recorded and provided in a computer-readable recording medium such as a compact disc read only memory (CD-ROM), a compact disc recordable (CD-R), a memory card, a digital versatile disk (DVD), and a flexible disk (FD) as an installable or executable file. The program for executing each of the different processes performed by the updating apparatus 10 and the information processing apparatus 20 according to the embodiment and the first and second modifications described above may be stored in a computer connected to a network such as the Internet and provided by being downloaded via the network. Furthermore, the program for executing each of the different processes performed by the updating apparatus 10 and the information processing apparatus 20 according to the embodiment and the first and second modifications described above may be provided or distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
   processing circuitry configured to acquire first distinctive information of a first piece of software to be executed;
   in response to determining that a whitelist that specifies distinctive information and hash values of individual pieces of software that are permitted to be executed records the distinctive information indicating the first distinctive information, distinctively identify, as second distinctive information, the distinctive information of a second piece of software that represents another piece of software relating to the first piece of software in the whitelist;
   calculate a hash value of the first piece of software;
   execute the first piece of software when the calculated hash value matches a hash value of the first piece of software specified in the whitelist; and
   delete the second distinctive information from the whitelist when the first piece of software has been executed.

2. The apparatus according to claim 1, wherein the processing circuitry is further configured to distinctively identify the second distinctive information using control information that associates the distinctive information with related distinctive information that indicates the other piece of software relating to the software that is distinctively identified by the distinctive information.

3. The apparatus according to claim 2, wherein the related distinctive information indicates the other piece of software that becomes unnecessary as a result of adoption of the software that is distinctively identified by the corresponding distinctive information.

4. The apparatus according to claim 2, wherein the related distinctive information indicates the other piece of software of a version earlier than a version of the software that is distinctively identified by the corresponding distinctive information.

5. The apparatus according to claim 2, wherein the processing circuitry is further configured to delete information relating to the second distinctive information from the control information when the second distinctive information is deleted from the whitelist.

6. The apparatus according to claim 2, wherein the processing circuitry is further configured to:
   acquire update information that includes update software and identification information of the other pieces of software relating to the update software;
   record the distinctive information of the update software in the whitelist; and
   update the control information using the update information.

7. The apparatus according to claim 6, wherein the update information includes the related distinctive information that indicates the distinctive information of the other pieces of software relating to the update software.

8. The apparatus according to claim 6, wherein the processing circuitry is further configured to record, in the control information, the related distinctive information that indicates the distinctive information of the other pieces of software that become unnecessary as a result of adoption of the update software and the distinctive information of the update software in association with each other.

9. The apparatus according to claim 6, wherein
   the update information further includes monitoring information that indicates the distinctive information of the software subjected to monitoring, and
   the processing circuitry is further configured to distinctively identify, as the second distinctive information, the distinctive information indicated in the monitoring information.

10. The apparatus according to claim 1, wherein the processing circuitry is further configured to output warning information to an output device when the acquired first distinctive information matches the second distinctive information that was previously distinctively identified.

11. The apparatus according to claim 10, wherein the processing circuitry is further configured to, when the acquired first distinctive information matches the second distinctive information that was previously distinctively identified, hold execution of the first piece of software and output the warning information to the output device.

12. An information processing method, comprising:
    acquiring first distinctive information of a first piece of software to be executed;
    in response to determining that a whitelist that specifies distinctive information and hash values of individual pieces of software that are permitted to be executed records the distinctive information indicating the first distinctive information, distinctively identifying, as second distinctive information, the distinctive information of a second piece of software that represents another piece of software relating to the first piece of software in the whitelist;
    calculating a hash value of the first piece of software;
    executing the first piece of software when the calculated hash value matches a hash value of the first piece of software specified in the whitelist; and
    deleting the second distinctive information from the whitelist when the first piece of software has been executed.

13. A computer program product comprising a non-transitory computer readable recording medium including programmed instructions, the instructions, when executed by a computer, causing the computer to:
    acquire first distinctive information of a first piece of software to be executed;
    in response to determining that a whitelist that specifies distinctive information and hash values of individual pieces of software that are permitted to be executed records the distinctive information indicating the first distinctive information, distinctively identify, as second distinctive information, the distinctive information of a second piece of software that represents another piece of software relating to the first piece of software in the whitelist;
    calculate a hash value of the first piece of software;

execute the first piece of software when the calculated hash value matches a hash value of the first piece of software specified in the whitelist; and delete the second distinctive information from the whitelist when the first piece of software has been executed.

\* \* \* \* \*